United States Patent [19]

Scardovi

[11] Patent Number: 4,743,924

[45] Date of Patent: May 10, 1988

[54] CONTROL CIRCUIT FOR AN INK JET PRINTING ELEMENT AND A METHOD OF DIMENSIONING AND MANUFACTURE RELATING THERETO

[75] Inventor: Alessandro Scardovi, Ivrea, Italy

[73] Assignee: Ing. C. Olivetti & C., S.p.A., Ivrea, Italy

[21] Appl. No.: 858,692

[22] Filed: May 2, 1986

[30] Foreign Application Priority Data

May 2, 1985 [IT] Italy .............................. 67401 A/85

[51] Int. Cl.[4] .............................................. G01D 15/16

[52] U.S. Cl. ................................. 346/140 R; 400/126

[58] Field of Search .................... 346/1.1, 75, 140 PD, 346/140 R; 400/126

[56] References Cited

U.S. PATENT DOCUMENTS

| | | | |
|---|---|---|---|
| 3,832,259 | 8/1974 | Van Zon | 156/293 |
| 4,112,433 | 9/1978 | Vernon | 346/140 |
| 4,424,520 | 1/1984 | Matsuda et al. | 346/140 |
| 4,485,386 | 11/1984 | Dagna et al. | 346/75 |
| 4,491,851 | 1/1985 | Mizuno et al. | 346/140 |
| 4,498,089 | 2/1985 | Scardovi | 346/140 |
| 4,528,578 | 7/1985 | Balbo | 346/140 |
| 4,528,579 | 7/1985 | Brescia | 346/140 |
| 4,535,346 | 8/1985 | Lichti | 346/140 R |
| 4,560,998 | 12/1985 | Wimmer | 346/140 |
| 4,630,072 | 12/1986 | Scardovi et al. | 346/140 |

FOREIGN PATENT DOCUMENTS

| | | |
|---|---|---|
| 0094032 | 5/1983 | European Pat. Off. . |
| 0099683 | 1/1984 | European Pat. Off. . |
| 0200457 | 4/1986 | European Pat. Off. . |
| 3319353 | 5/1983 | Fed. Rep. of Germany . |

OTHER PUBLICATIONS

Olivetti, Research & Technology Review, No. 2, 1984.

*Primary Examiner*—E. A. Goldberg
*Assistant Examiner*—Mark Reinhart
*Attorney, Agent, or Firm*—Banner, Birch, McKie & Beckett

[57] ABSTRACT

A control circuit (17) applies a voltage pulse to a piezoelectric transducer (16) to create pressure in a chamber (10) open to an ink reservoir (14) at one end and closed by an ink nozzle (13) at the other. The control circuit (17) generates a pulse formed by one or two waves, each comprising a secondary portion delayed relative to the primary portion by a time which is double the reflection time that is characteristic of the chamber (10), thereby cancelling reflection of the drop expulsion pressure. The form of the wave is determined by a series of variable resistors disposed in the circuit while the time is regulated by an element for regulating the period of oscillation of the circuit. Alternatively the form of the wave is recorded in digital form in an ROM addressed by a counter while the period of oscillation is regulated by acting on a timer for controlling the counter.

21 Claims, 7 Drawing Sheets

CONTROL CIRCUIT FOR AN INK JET PRINTING ELEMENT AND A METHOD OF DIMENSIONING AND MANUFACTURE RELATING THERETO

BACKGROUND OF THE INVENTION

The present invention relates to a control circuit for an on-demand ink jet printing element and to a method of dimensioning and manufacture relating thereto.

In on-demand ink jet printing, following the emission of a droplet of ink, a train of longitudinal acoustic waves is normally generated in the ink ejecting chamber, the waves being reflected by the terminal portions of the chamber. The reflection at the nozzle and the connection of the chamber to the container causes disturbances in regard to the subsequent emission of drops, which make it impossible to achieve high rates of emission.

Various remedies have been proposed in order to reduce or eliminate the effect of such reflection phenomena. A first remedy lies in using an ink which is of high viscosity but that requires the use of special highly absorbent papers. The viscosity of the ink makes it possible to reduce the effect of the reflection phenomemon only if the duct is of a certain length and for operating frequencies of lower than 3000 Hz.

Another remedy that has been proposed is that the ejection chamber should be connected to the container for the ink by means which attenuate or damp the energy of such waves. In a known arrangement, it has been proposed that a tube should be disposed between the chamber and the container, the tube being of a suitable viscoelastic material, that is to say, being such as to have an acoustic impedance equal to that of the chamber. In order for the rearward tube to absorb all the energy of the pressure, it must however be of excessive length sot that it is not possible to provide heads having a plurality of nozzles which are close together, while the junction between the emission chamber and the rearward tube promotes the generation and retention of bubbles which interfere with the subsequent emission of drops.

It has also been proposed that the length of the tube connecting the chamber to the container should be reduced, by adding thereto a concentrated resistance, for example a rigid element of an hourglass configuration, for damping the residual energy of the wave before it reaches the container. That printing element, even if it gives satisfactory results in regard to reliability and ink ejection frequency, is however rather complicated and difficult to set up and adjust.

Ways have also been proposed for eliminating the acoustic waves by means of a second pressure pulse which acts with a certain delay with respect to the expulsion pressure pulse. In a known arrangement, the second pulse is delayed for a time corresponding to the frequency of oscillation of the meniscus, which is around 2.5 KHz, so that it is not suitable for eliminating the acoustic waves of a frequency different from that of the meniscus.

In an another known arrangement, it has been proposed that the pressure wave should be suppressed by forming a duct with two separate chambers divided by a fluidic diode, and exciting a piezoelectric transducer with a second electrical pulse which is delayed with respect to the expulsion pulse. That arrangement is suited to printing elements which are connected to the container by way of a constriction, in such a way as to represent a duct which is substantially closed at both ends. That is therefore not suitable for suppressing totally the acoustic wave which derives from expulsion of the drop of ink.

SUMMARY OF THE INVENTION

The object of the present invention is to provide a control circuit for a printing element which is open to the container, in such a way as to achieve total cancellation of the pressure waves generated by the expulsion of each drop.

The invention accordingly provides a control circuit for an ondemand ink jet printing element comprising a chamber which is closed at one end by a capillary nozzle and which is in direct communication at the other end with an ink container, and an electrical voltage transducer for varying the pressure of the ink in the chamber, the control circuit being adapted to generate a voltage pulse for each drop to be expelled, wherein the circuit comprises adjustable means for varying the duration and the form of said pulse such that it can suppress the acoustic reflection waves of the pressure wave which produces expulsion of the drop.

These and other features of the invention will be more clearly apparent from the following description of some embodiments which are given by way of non-limiting example with reference to the accompanying drawings.

DETAILED DESCRIPTION OF THE PREFERRED EMBODIMENTS

Figure 1:
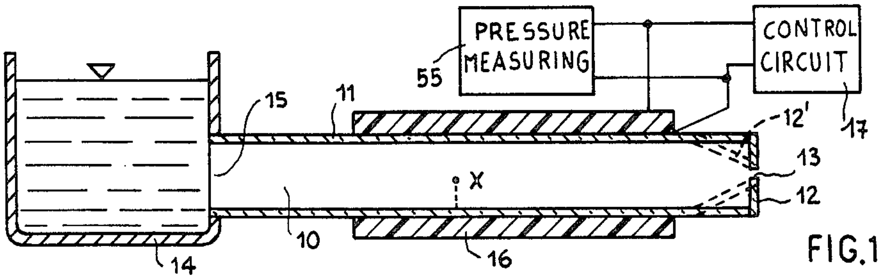
FIG. 1 is a diagrammatic view of an ink jet printing element incorporating a pilot control circuit embodying the invention.

The ink jet printing element shown in FIG. 1 comprises a chamber 10 defined by a duct 11 which is closed at one end by a wall 12 provided with a nozzle 13. The duct 11 is connected at its rearward end directly to a container or reservoir 14 for the ink by way of a section 15 which is substantially equal to the section of the duct 11, that is to say without any restriction, whereby the rearward end may be considered as being open towards the container 14. Alternatively the rearward end of the duct 11 may be connected to the container 14 by way of an intermediate means which permits almost total reflection of the acoustic waves of the chamber 10, for example by way of a tube of a material which is extremely soft and yielding.

In particular, in FIG. 1 the duct 11 is of a cylindrical shape, being made of glass or other material, and being of a length L. It is coupled to a piezoelectric transducer 16 which is in the form of a sleeve which is shorter in length than the length L of the duct 11, and which adheres to the outside surface of the duct 11. The transducer 16 is excited by a control circuit generally indicated by reference numeral 17, in such a way as to vary the volume of the chamber 10, generating a pressure wave such as to expel a droplet of ink through the nozzle 13.

Alternatively, the chamber 10 may be defined by a duct of prismatic shape and the piezoelectric transducer may be in the form of a plate member applied to a flat face of the prism. In each case, for the purposes of propagation of the acoustic waves, the chamber 10 is defined by a duct 11 which is closed at one end by the wall 12 of the nozzle 13 and open at the end of the section for connection to the container 14. The distance L between the two ends determines the length of the duct 11.

Figure 2:
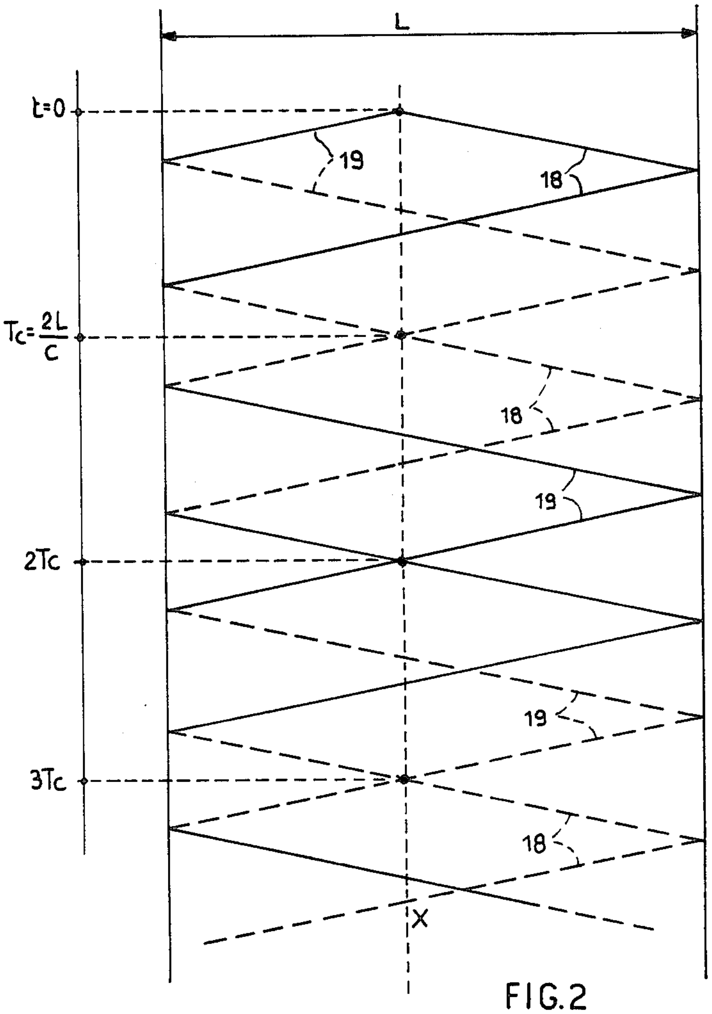
FIG. 2 is a diagrammatic view of the pressure waves which are generated in the printing element shown in FIG. 1.

In a duct 11 as defined above, following an elementary voltage pulse applied to the transducer 16 at a general point X within the length of the transducer 16, two elementary longitudinal pressure waves are generated at the time $t=0$ (FIG. 2); a progressive wave which is directed towards the nozzle 13 and which is indicated by the line 18, and a regressive wave which is directed towards the section 15 and indicated by the line 19. The two waves 18 and 19 pass through the duct 11 at the speed of sound C as represented in FIG. 1 by the inclination of the lines 18 and 19, and they are reflected repeatedly at the two ends. The two waves 18 and 19 are reflected by the end of the duct 11 which is connected to the container 14, with waves of inverted sign. The sign inversion effect is indicated in FIG. 1 by the change from the portions of the lines 18 and 19 which are represented by solid lines, to the portions of the lines which are represented by broken lines, and vice-versa.

The time taken by each wave to pass through the entire duct is $tp=L/C$. It is easy to see that, at each even multiple of the time tp, the two pressure waves are again at the starting point X, with a sign corresponding to the number of reflections which have taken place. Hereinafter the time $Tc=2L/C$ will be referred to as the characteristic time of the duct 11.

If at point X, there is injected a pressure generated by a voltage pulse of any configuration or wave form in respect of time, the pressure assumes a configuration corresponding to that of the voltage. The evolution in respect of time of that pressure provides for the addition at each point, to the original pressure, of other reflected pressure waves which are progressively delayed by successive multiples of the characteristic time Tc.

Therefore, at each odd multiple of the characteristic time Tc, the pressure wave occurs at the starting point X with an inverted sign while at each even multiple the pressure wave occurs at the point X with the initial sign.

According to the invention, the control circuit 17 is operable to generate a single voltage pulse for each drop to be expelled, of a duration and waveform such as to generate at the point X, after a time equal to an even multiple of the characteristic time Tc, a pressure which is opposite to the original pressure and which suppresses or cancels, that is to say completely neutralizes, the resultant of the original pressure wave and the associated reflections. The form of the voltage pulse and thus of the pressure at the point X must be regulated in dependence on the length L of the duct 11 (FIG. 1), the number of reflections to which the original wave has been subjected, and the attenuation effect that it has experienced in the time prior to cancellation.

Since the wall of the duct which carries the nozzle is generally tapered, as indicated in FIG. 1 by the configuration shown at 12' in broken lines, to take account of the phase displacement generated thereby in the reflected wave, it is also necessary to deform or distort the form of the voltage pulse in dependence on the form of the wall 12'.

After such cancellation of the pressure pulse, the ink in the duct 11 returns perfectly to a calm condition so that the voltage wave which is such as to generate such a cancellation effect will be referred to hereinafter as reflection suppressing or "self-cancelling".

Since the duct 11 is generally of a length L between 15 and 20 mm and the speed of sound C is around 1500 m/sec, the characteristic time Tc is between 20 and 26.6 μsec whereby the voltage pulse is to effect self-cancellation with a delay of between 40 and 53.2 μsec. In the case of the square wave 20 shown in FIG. 3, it is thus possible to achieve drop emission with a maximum frequency dependent on the above-mentioned length L, between 25 and 18.7 KHz.

Figure 3:
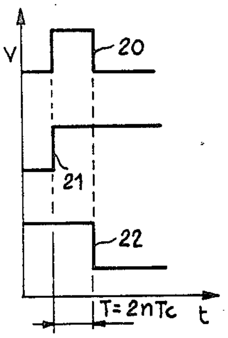
FIG. 3 is a diagram of a control voltage wave with the effect of cancelling the reflection phenomenon, according to the invention.

The simplest self-cancelling voltage wave form is the square wave 20 shown in FIG. 3, with a duration T which is a multiple of 2Tc. Generally it is preferred that $T=2Tc$ in order to have the maximum frequency of emission free of interference. The square wave 20 can in fact be considered as being formed by a rising edge 21 which generates the primary pressure wave and a falling edge 22 which generates a secondary or cancelling pressure wave.

Figure 4:
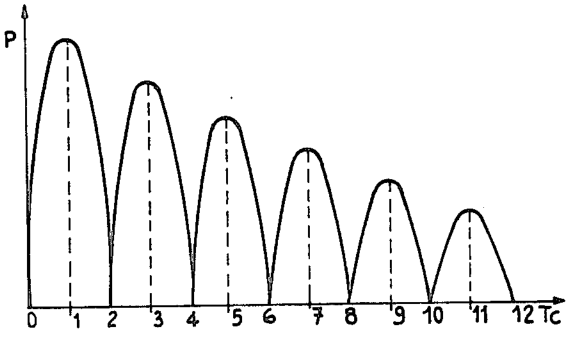
FIG. 4 is a diagram showing the pressure in the printing element in dependence on the duration of the voltage wave.

Upon variation in the duration of the pulse 20, the pattern of the pressure at the point X in the chamber 10 from the initial moment is that shown in FIG. 4. It will be seen that, for a duration which is equal to even multiples of Tc, the value of the pressure is zeroed while for a duration equal to odd multiples, the value of the pressure is at a maximum which at the beginning is around double the initial pressure due just to the rising edge of the wave 20. It will be appreciated that that maximum which is due to the sum of the original wave and the reflection decreases in time due to the effect of the losses of energy in the duct 11.

The cancellation circuit used with rearwardly open ducts retains the advantage of automatically expelling any air bubbles within the duct. That is primarily due to two aspects regarding the variations in the internal pressures in the duct.

The first aspect is due to the fact that, in a duct which is open at the rear and closed at the front, the pressure is not uniformly distributed but is zero at the rearward opening and gradually increases with length to reach a maximum at the opposite end, that is to say at the closed terminal end where the nozzle is disposed, whereby there is a positive pressure gradient over the entire length of the duct.

A bubble which is subjected to an alternating pressure field oscillates in terms of size by contracting and expanding.

If the resonance frequency of the bubble is higher than the frequency of the pressure field, the movements thereof will be in phase with the field, but if its frequency is lower, the movements will be in phase opposition. In the presence of a pressure gradient, the sum of the forces acting on the surface of the bubble are not zero since the surface area on which it acts is different during the positive phase involving increase in the pressure with respect to the negative phase involving a reduction in the pressure. That generates a component of the force which pushes the bubble towards the pressure maximum (that is to say towards the nozzle) if the bubble is small and has a resonance frequency higher than that of the pressure field while it pushes it towards the fack if the bubble is large and has a lower resonance frequency.

In actual fact, in the spectrum of a pilot control effect, particularly if repeated, there are many frequencies including also very low frequencies and the effect which is generated with in-phase oscillation is markedly greater than that with counter-phase oscillations since the amplitudes of oscillation of the bubble are much higher in the former case than in the second case. That therefore means that all the bubbles have a tendency to be urged in any case towards the tip and to be expelled from the nozzle.

The second aspect is due to the fact that when they pass into the duct which is suitable for cancellation they render it completely unsuitable by substantially altering the conditions in respect of pressure.

That causes a positive reaction in the system since the more the system is rendered unsuitable for cancellation, the greater is the increase in the pressure maximums with a consequential increase in the expulsion force which acts on the bubble.

Figure 5:
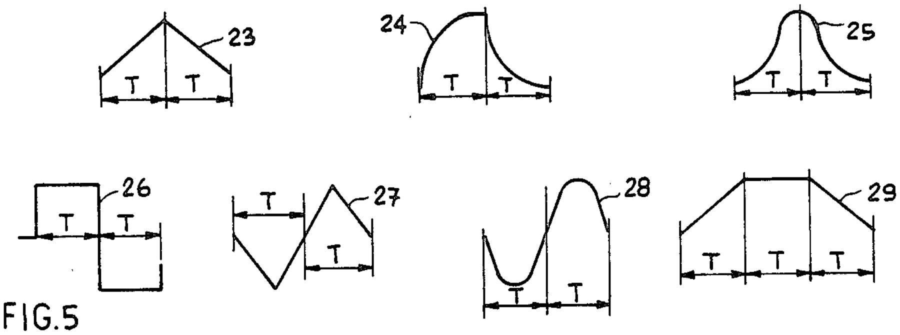
FIG. 5 shows a series of control voltage waves as used in the invention.

FIG. 5 shows six other self-cancelling waves 23, 24, 25, 26, 27 and 28. The common property of these waves is that the portion of wave which generates the secondary pressure is delayed by the above-mentioned time T=2Tc, whereby the duration of each of the two portions of voltage wave is to be 2Tc. FIG. 5 also shows a wave 29 which is similar to the wave 23 but with a delay in the second portion of 2T=4Tc whereby it is also self-cancelling. It will be appreciated that it is possible to add to the self-cancelling waves in FIG. 5, the inverted waves which are also all self-cancelling.

The maximum frequency which can be obtained with a duct 11 of a length of between 15 and 20 mm in the case of the wave form 23 to 28 is between 25 and 18.7 KHz while in the case of the wave form 29 it is between 8.3 and 6.2 KHz.

Figure 6:
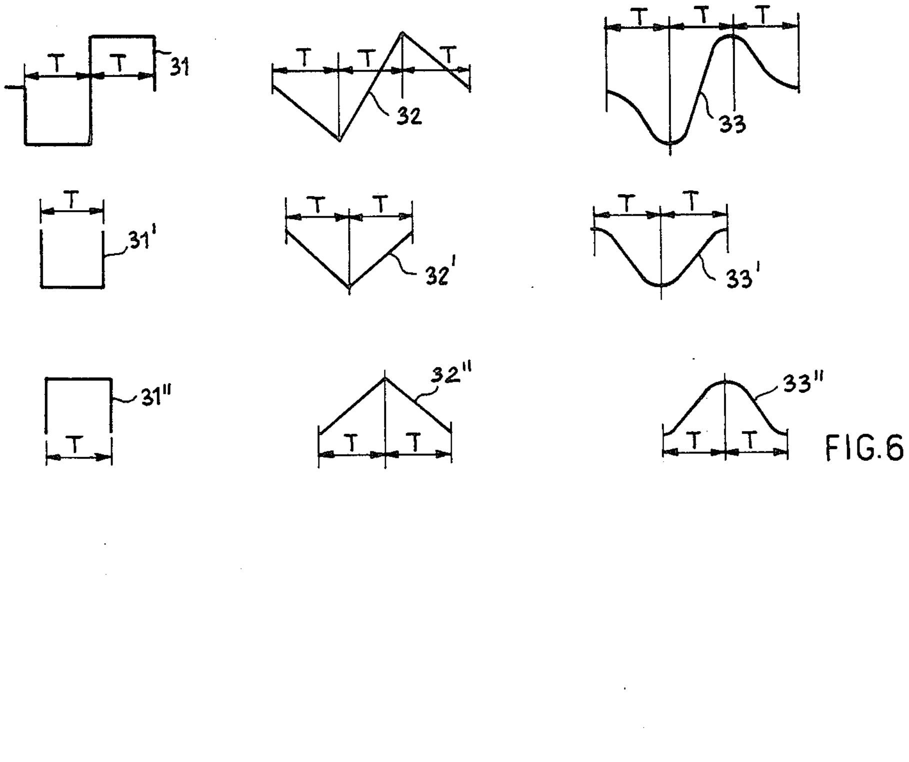
FIG. 6 is a diagrammatic view showing some types of voltage waves with a double reflection cancellation effect.
Figure 7:
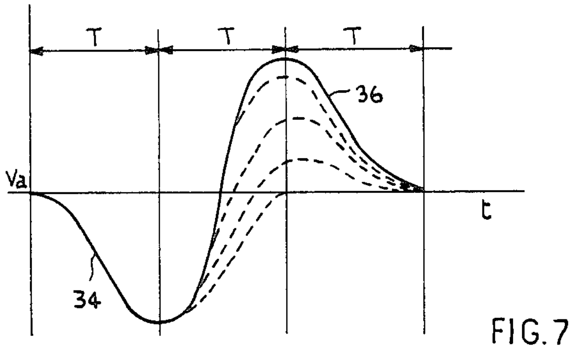
FIG. 7 is a diagram showing a family of similar voltage waves with a double cancellation effect.

FIG. 6 shows three examples of voltage waves 31, 32 and 33, each of which is formed by the sum of two waves 31′ and 31″, 32′ and 32″, 33′ and 33″, which in turn are self-cancelling. The resulting waves 31, 32 and 33 will therefore be referred to as "double cancellation" waves. They have been obtained from two opposite waves of equal amplitude, but they may also be obtained from waves of different amplitudes, whereby it is possible to produce a resultant wave which is optimized, besides for cancellation of the reflections of longitudinal acoustic waves, also for other interferences which may have an influence on perfect discharge of the drop from the nozzle 13. For example to avoid such disturbances, the U.S. Pat. No. 4,498,089, assigned to the same Assignee of the present invention, proposes a control circuit for generating a cyclic voltage wave which does not have any harmonics, being formed by a negative half-wave 34 (see FIG. 7), followed by a positive half-wave 36. According to the present invention, the two half-waves are now made self-cancelling while the second half-wave 36 may be chosen from a family of waves shown in broken lines in FIG. 7. That choice may be effected by virtue of deformation of the initial wave 34, 36 to take account of the objective conditions of the duct 11, i.e. the presence of a tube and/or a filter between the duct 11 and the reservoir 14.

Figure 8:
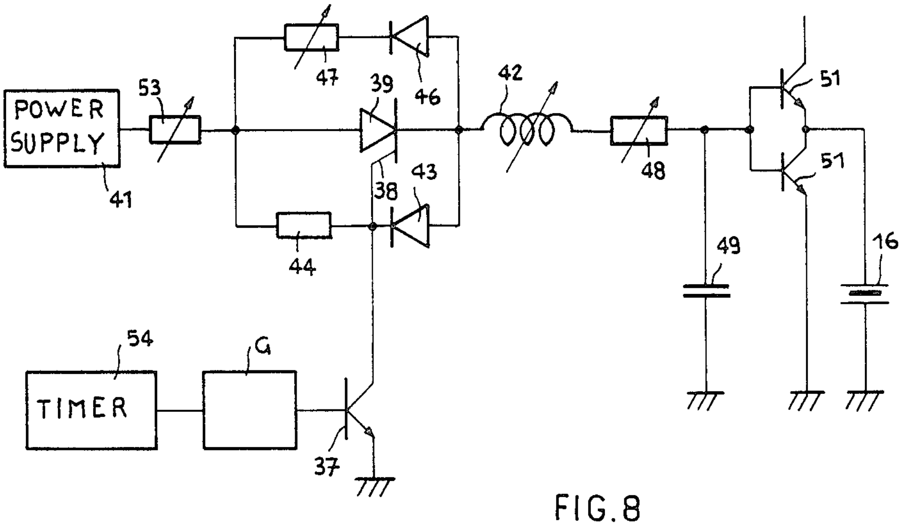
FIG. 8 shows a control circuit in accordance with a second embodiment of the invention.

The control circuit shown in FIG. 8 comprises a generator G for generating a logic pulse for controlling drop emission, of predetermined duration. The generator G is connected to the base of a transistor 37 whose collector is connected to an electrode 38 of a controlled diode 39.

The diode 39 is connected for a direct flow from a power supply 41 for providing a d.c. voltage Va (see FIG. 7), to an inductor 42 (see FIG. 8). A feedback circuit from the inductor 42 to the supply 41 comprising a diode 43 and a resistor 44 makes it possible to prevent the diode 39 from being in the conducting condition at the beginning of the pulse from the generator G, while permitting it to be switched back into the conducting condition at the end of that pulse, to generate the second half-wave 36 (FIG. 7) as described in above-mentioned U.S. Pat. No. 4,498,089.

In accordance with the present invention, the circuit shown in FIG. 8 comprises a second feedback circuit comprising another diode 46 and a resistor 47. The latter is adjustable so as to make it possible to vary the final part of the half-wave 36 so as to vary the critical damping in respect of connection of that half-wave with the feed voltage Va. The inductor 42 is in turn connected in series with a resistor 48 and a constant-capacitance capacitor 49 with which it forms a damped oscillating circuit. The inductor 42 is adjustable so as to vary the period of oscillation of the circuit while the resistor 48 is adjustable to vary the damping effect, that is to say the relationship between the negative peak of the half-wave 34 (FIG. 7) and the positive peak of the half-wave 36.

As is known, the piezoelectric transducer 16 (see FIG. 8) substantially represents a capacitance whose value undergoes variations upon a variation in temperature. In order to make the period of oscillation of the pilot control circuit 17 substantially independent of such variations, the transducer 16 is connected to the resistor 48 in parallel with the capacitor 49 by way of an amplifier formed by two transistors 51 and 52 whose gain is of the order of 30–40. The effect of the variation in capacitance of the transducer 16 on the circuit 17 is thus divided by that gain and is almost negligible.

Finally, associated with the feeder 41 is a regulating circuit, for example an adjustable resistor 53, for varying the supply voltage Va, by means of which the overall amplitude of the wave form and thus the speed of discharge of the drop are varied. In turn, associated with the generator G is a regulating circuit 54, for example a timer, for regulating the duration of the logic pulse for controlling the transistor 37, wherby a phase distortion may be introduced into the wave 34, 36 (FIG. 7) to take account of the effective form of the wall 12' of the nozzle 13 (FIG. 1).

The resistors 47, 48 and 53 (FIG. 8), the circuit 54 and the inductor 42 are calibrated as a preliminary step by empirical means in an iterative manner, by means of a device 55 (see FIG. 1) for detecting the internal pressure of the chamber 10 and thus at any time the pressure residue due to the reflection phenomena. This device may advantageously comprise that described in the Italian patent application No. 67276-A/85 entitled: "Device for measuring the pressure in an ink jet printing element", wherein the pressure sensor is formed by the same piezoelectric transducer 16. In that way, measurements of the pressure in the duct 11 are effected under the conditions of operation of the printing element. In particular, the adjustment operation is performed iteratively, by first adjusting the resistors 47 and 48 in such a way as to optimize amplitude, damping and final connection of the voltage wave 34, 36 (see FIG. 7), and to have both the half-waves with self-cancelling characteristics. Adjustment of the circuit 54 (FIG. 8) is then effected, in such a way as to correct the phase of the reflected wave, in order to remove any effects of the reflected wave which are due to the form of the end portion 12' (FIG. 1) of the nozzle 13. Adjustment of the resistor 53 (see FIG. 8) is then effected so as to achieve the desired speed of the drop. Finally, calibration of the inductor 42 is effected in order to vary the period of oscillation of the wave, so that it is equal to 4Tc. That condition may be detected by observing on an oscilloscope connected to the detector 55, the disappearance of the reflections of the control wave. A stroboscopic drop detector which is suitably synchronized with the control pulse generator G will then show the drop in a fixed position upon variation in the frequency of emission.

The above-mentioned preliminary adjustment operation is performed in the design stage to define the values of the resistors and the inductor to be used thereafter in mass production of printing elements. However for various reasons it is then necessary to effect a check on the adjustment that is to say a fine adjustment operation, on the individual control circuit 17 of a printing element. For that purpose, in accordance with the invention, in the design stage, the values of the resistors 47, 48 and 53 and the circuit 54 are precisely defined, and they remain fixed in all the printing elements which are produced with such a control circuit, while the inductor 42 is designed with the possibility of fine adjustment within certain limits on the individual circuit 17. Fine adjustment is then effected individually on the control circuit 17 of the individual printing elements, being limited to the inductor 42, that is to say to the pulse oscillation period.

It will be clear from the foregoing description that the method of dimensioning and manufacture of the control circuit comprises a phase for initial adjustment of the control wave form and a phase for fine adjustment relating to the duration of the cycle of the wave. It will also be clear that the control wave is unique and comprises two portions which are both self-cancelling for the longitudinal acoustic waves which are generated in the duct 11.

Figure 9:
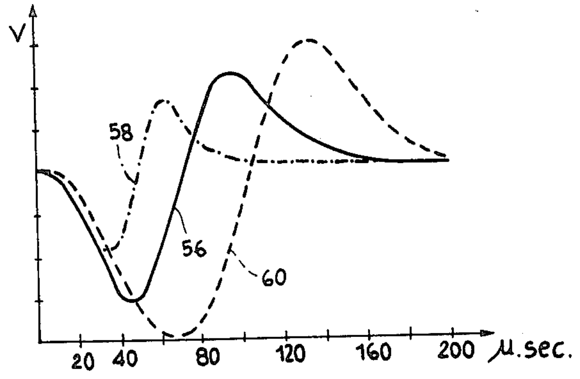
FIGS. 9, 10, 11 and 12 show some diagrams illustrating the effect of cancellation of the reflection phenomena in a printing element.

In FIG. 9, the continuous line indicates a voltage wave form 56 on which all the above-mentioned adjustment operations have been carried out. It will be seen therefrom that the second part of the wave 56 has been deformed wtih respect to the configuration of the curve 36 shown in FIG. 7. The curve 56 (see FIG. 9) has, with respect to the initial voltage, a positive peak value which is lower than that of the negative peak, from which it will be clear that, in order to take account of the effective form of the wall 12' (see FIG. 1), the control pulse was selected in accordance with one of the broken-line curves shown in FIG. 7. In regard to the curve 56, a value of T=2Tc has been selected, at which the total period of the wave is equal to 6Tc. By making the duct 11 of a suitable length, it is thus possible to produce a maximum pilot control frequency which is greater than 8 KHz. The pressure measured within the duct assumes the configuration 57 shown in solid line in FIG. 10, from which it will be clear that the pressure returns to the initial value immediately after the positive peak of the pulse.

Figure 10:
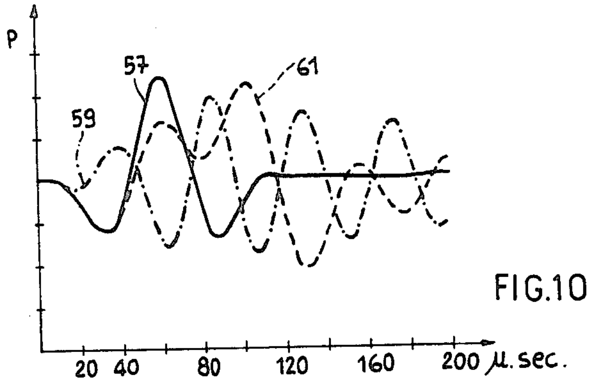

By varying the period of the pulse in such a way that T=Tc, it is possible to obtain the voltage wave form 58 (in dashdotted lines in FIG. 9) which is similar to the curve 56, but that generates a pressure configuration as indicated at 59 in FIG. 10, which demonstrates the presence of reflection phenomena. Similarly, varying the period of the pulse in such a way as to give T=3Tc gives a voltage wave form 60 (shown in broken lines in FIG. 9) which generates a pressure configuration 61 (FIG. 10) which also indicates the presence of reflection.

Figure 11:
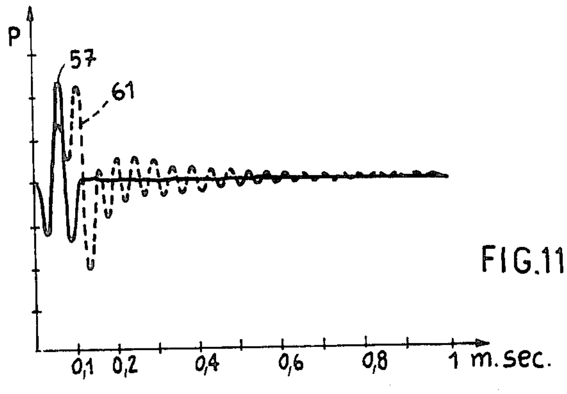

The curves 56–61 (FIGS. 9 and 10) were obtained experimentally and detected by means of an oscilloscope. The curves 57 and 61 in respect of pressure are plotted in FIG. 11 with the scale of the abscissae which is five times smaller than that used in FIG. 10. For the sake of clarity of the drawing, the curve 59 has not been shown in FIG. 11, since after the first wave it is similar to the curve 61 and dies away equally slowly. It will be clear from FIG. 11 that while, in the case of curve 57, cancellation of the acoustic waves is complete, in the case of curves 59 and 61 reflections continue for a long time, dying away slowly.

Figure 12:
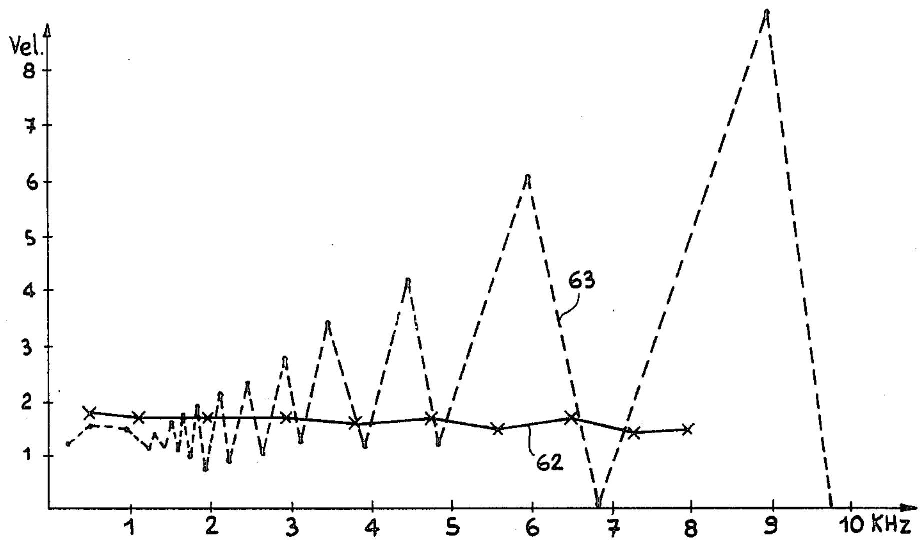

FIG. 12 shows the variations in the speed of the drop in dependence on the frequency of emission, that is to say the rate of repetition of the control pulses. The solid line 62 shows the speed of the drop in the case of control with the self-cancelling pulse 56. It will be seen therefrom that the speed of the drop experiences virtually no variation upon a variation in frequency. The measurements made are indicated by small crosses.

The broken line 63 however represents the speed of the drop in the case of control using the pulse 58 which does not suppress reflection phenomena. The curve 63 shows the way in which, because of reflection of the acoustic wave, the variation in speed is maintained within an acceptable range up to around 1 KHz, but at higher frequencies the variation in speed assumes enormous values, thus clearly showing the enormous advantage achieved with the control circuit according to the invention.

Figure 13:
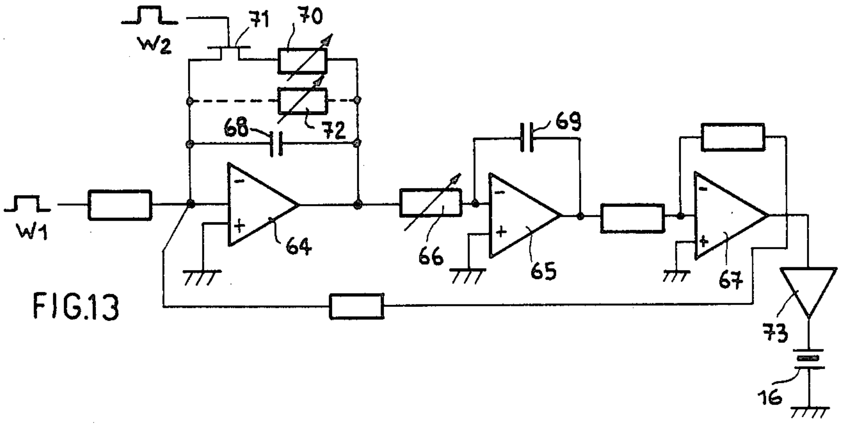
FIG. 13 shows a control circuit in accordance with a further embodiment of the invention.

The circuit shown in FIG. 8 is capable of directly generating the voltage wave used by the transducer 16 whereby relatively high voltages are found in the components thereof, including those which are to be adjusted. In accordace with another embodiment of the invention, the control circuit may be formed by linear integrated components operating at low voltage. Referring to FIG. 13, the low voltage control circuit comprises two amplifiers 64 and 65 which are connected in cascade relationship by means of a variable resistor 66. The two amplifiers 64 and 65 operate as integrators and have a negative feedback by way of a third amplifier 67 connected to the amplifier 64.

Figure 14:
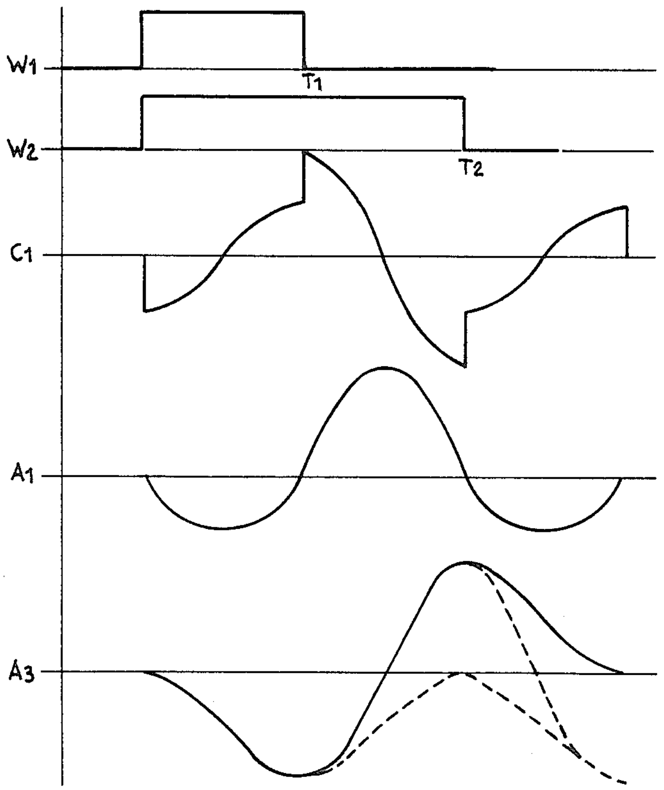
FIG. 14 shows a diagram in respect of operation of the circuit shown in FIG. 13.

The amplifier 64 receives at its input a control signal W1 and is associated with a capacitor 68 while the amplifier 65 is associated with another capacitor 69. Disposed in parallel with the capacitor 68 are a variable resistor 70 and an analog switch 71 which is controlled by a second control signal W2 of greater length than W1 (see FIG. 14). When the switch 71 (FIG. 13) is open, the circuit behaves like an oscillator with a predetermined resonance frequency. When however the switch 71 is closed, if the resistor 70 is smaller in value than a given critical value, the circuit is no longer an oscillating circuit and it takes on the behaviour of a circuit with critical damping. A variable resistor 72 in parallel with the capacitor 68 however modifies the damping effect introduced by the resistor 70.

Normally the two signals W1 and W2 are at zero and the switch 71 is stably in a rest condition. To generate a control pulse the two signals W1 and W2 (FIG. 4) simultaneously change their state and the circuit assumes the oscillator configuration. Since the sum of the input currents to the amplifier 64 is to be made zero, the current in the capacitor 68 assumes the configuration indicated by C1 in FIG. 14 in which each step in the control signal generates an inverting sinusoidal curve. Since the amplifier 64 (FIG. 3) acts as an integrator, the output voltage of the amplifier is of the configuration indicated at A1 in FIG. 14. That voltage is subsequently integrated and inverted by the amplifier 65 and inverted again by the amplifier 67 which outputs a signal A3. That signal has two half-waves whose theoretical peak value is around double the voltage of the signal W1 whereby the signal A3 is also at low voltage and forms the low voltage pulse for control of the transducer 16. The low voltage control wave form is taken off at the output of the amplifier 67 and converted by way of an amplification circuit 73 into a control voltage and applied to the piezoelectric transducer 16.

The signal A3 is so adjusted as to be self-cancelling, by dimensionng and regulating the various components of the circuit. First of all, the duration of the pulse W1 is defined in such a way as to be substantially equal to a third of the period of the pulse, that is to say T=2Tc. In that way W1 ceases before the voltage A1 goes from the negative value to the positive value. A longer duration in respect of the pulse W1 would generate a lower curve as indicated in broken line in FIG. 14, from the negative peak of the voltage curve A3. By adjusting the duration of the signal W1 within certain limits, for example in the manner envisaged in relation to the generator G in FIG. 8, distortion is caused in the pulse A3 (see FIG. 14), by moving the point of its passage through zero from the negative half-wave to the positive half-wave.

The duration of the signal W2 is so defined that it is substantially double that of W1, that is to say 2T=4Tc. In that way W2 ceases when the curve of the voltage A3 reaches its positive maximum. The critical damping resistor 70 is then brought in, which puts the curve A3 to the initial value. A longer duration for the signal W2 would generate a lower curve as indicated by the broken line in FIG. 14, from the positive peak of the voltage curve A3.

The voltage curve A3 can then be finally set experimentally by adjusting the resistor 70 (see FIG. 3) to vary the critical oscillation damping effect, and by adjusting the resistor 72 in order to introduce a damping effect such as to control the ratios between the pressures in the various phases of the cycle, whereby account is taken of the phase displacement generated by the wall 12' (see FIG. 1) of the duct. Finally, by adjusting the resistor 66 (see FIG. 13), the period of oscillation of the pulse is varied while the amplitude of the control wave is regulated by adjusting the gain of the amplifier circuit 73.

The circuit shown in FIG. 13 may be adjusted in a similar manner to that described hereinbefore in relation to the circuit of FIG. 8, in the design stage. Fine adjustment for the individual printing element can be limited just to the resistor 66 which regulates the period of the oscillator circuit.

The two signals W1 and W2 can be generated and regulated independently of each other by means of a per se known logic signal generator. Normally it is preferable to regulate only the duration of W1. Alternatively, the signal W2 may be generated automatically from the signal W1 whereby the ratio between the two durations is kept constant.

Figure 15:
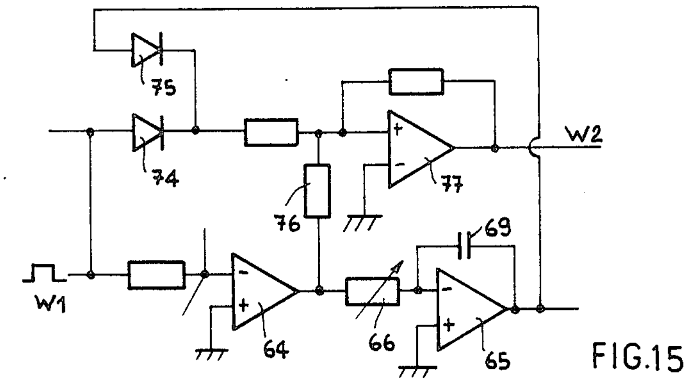
FIG. 15 shows an alternative form of the circuit of FIG. 13.

Referring to FIG. 15, the signal W1 is added to the output signal from the amplifier 65 by way of two diodes 74 and 75. The output signal from the amplifier 64 is added to the resulting signal, by way of a resistor 76. The resulting signal is applied to an amplifier 77 operating as a comparator with positive feedback, whereby it does not operate linearly but in a jerk mode when the signal at its input changes in sign.

In particular, the output of the comparator 77 is forced up immediately at the beginning of the pilot control action due to the effect of the signal W1. At the end of the signal W1, it is kept at a high level by the output of the amplifier 65. When that output becomes negative, the effect thereof ceases since the signal is blocked by the diode 75. Since however the output signal A1 (FIG. 14) from the amplifier 64 then becomes positive, the output of the comparator 77 remains high. When then the signal A1 becomes negative, the output of the comparator 77 returns to a low level whereby the output signal W2 ceases and the switch 71 closes.

In accordance with an alternative form of the FIG. 13 circuit, the final inverting amplifier 67 of the low voltage circuit may be incorporated in the high voltage amplifier 73. For that purpose, the signal W1 (FIG. 16) now controls the base of a transistor 95 which, by way of a variable resistor 96, controls the input of the amplifier 64. The output of the amplifier 65 controls the base of another transistor 97 which controls feedback of the amplifier 64. In addition the transistor 97 controls an amplification stage formed by two transistors 98 connected to the transducer 16 in a similar manner to the transistors 51 (FIG. 8).

Regulation of the amplitude of the control pulse is now effected by adjusting the resistor 96 while the other regulation operations are effected in a similar manner to that described hereinbefore in relation to the circuit shown in FIG. 13.

In accordance with a further embodiment of the invention, the circuit for control of the transducer 16 may be of the digital low voltage type. That circuit comprises a counter 78 (see FIG. 17) for counting pulses supplied by a timer 79 to define a series of successive times in the cycle of the control wave.

Figure 16:
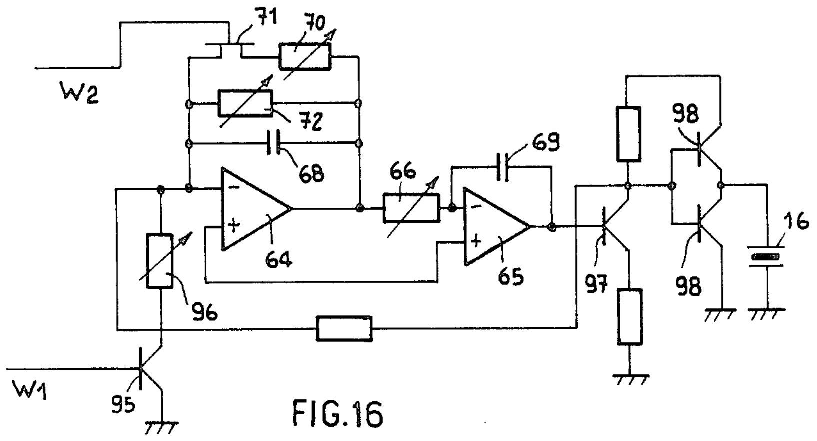
FIG. 16 shows another alternative form of the circuit shown in FIG. 13.

The counter 78 is caused to start counting when it receives a control signal from a generator 80. The counter 78 is arranged to address a read only memory such as an ROM 81 or an EPROM, in which each address represents a moment in the control cycle and the various moments are at regular intervals. For each address in the ROM 81 there is recorded a numerical value corresponding to the amplitude of the pilot control wave at that time. The control wave is produced from the numerical data taken from the ROM 81, being converted into voltages by a digital-analog converter 82. Finally that wave controls the transducer 16 by way of an amplifier circuit 73 like that of the circuit shown in FIG. 13. In the circuit shown in FIG. 17, all the adjustment operations for the control circuit 17 referred to for the circuits of FIGS. 8, 13 and 16, are to be effected before recording in the ROM 81. Fine adjustment for varying the duration of the respective control cycle in each individual circuit however is effected by varying the emission frequency of the timer 79.

Figure 17:
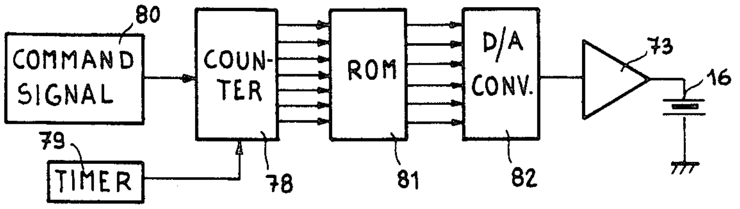
FIG. 17 illustrates a control circuit in accordance with another embodiment of the invention.
Figure 18:
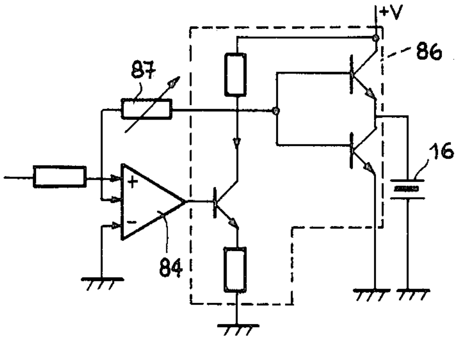
FIGS. 18 and 19 show two amplifier circuits for the control circuits of FIGS. 13 and 17.
Figure 19:
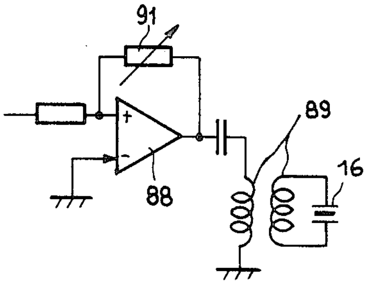

The amplifier circuit generally indicated by reference numeral 73 in the circuits shown in FIGS. 13 and 17 may comprise a stage formed by a low voltage integrated operational amplifier 84 (see FIG. 18) connected to a second stage formed by a transistorized amplifier 86 which requires a feed voltage of the order of 150 V. Gain adjustment in order to vary the speed of the drop is effected by adjusting a variable resistor 87 disposed between the two stages 84 and 86.

Alternatively, the amplifier circuit 73 may be formed by a first stage formed by a low voltage amplifier 88 and a second stage comprising a transformer 89 whose primary winding is connected to the amplifier 88 and whose secondary winding supplies the transducer 16 with the pilot control voltage, whereby there is no need for a high voltage feed; the transformer 89 may have a turns ratio of from 5 to 10. Gain adjustment is also effected herein by adjusting a variable resistor 91 connected in parallel with the amplifier 88.

Figure 20:
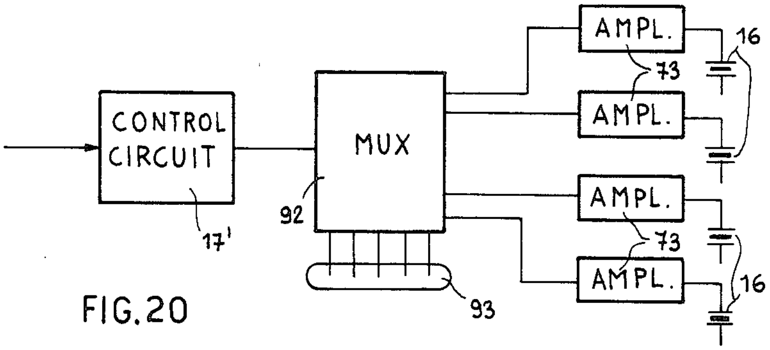
FIG. 20 is a diagrammatic view of a control circuit for a multiple printing head.

The low voltage circuits in FIGS. 13 and 17 may be used for controlling a plurality of printing elements, for example a multi-nozzle printing head. For that purpose, a single control circuit 17' is connected to a series of amplifier circuits 73 (see FIG. 20) by way of a multiplexer 92. The multiplexer in turn selects the amplifier 73 in dependence on a code received on an input bus 93 by means of which all the printing elements may be connected to the single control circuit 17' either simultaneously or at various times.

I claim:

1. In an on-demand ink jet printing element comprising a chamber normally filled with ink and closed at one end by a capillary nozzle, an ink reservoir connected to another end of said chamber, and an electric voltage transducer operable for causing a variation of the pressure of the ink in said chamber, said chamber having a characteristic acoustic frequency defining a characteristic time requested by a pressure wave caused by said variation to return to the starting point in the chamber upon being acoustically reflected between said ends, the combination of a signal generator for generating a logic signal for causing the emission of an ink droplet from said chamber through said nozzle, an electric control circuit operable in response to said logic signal for generating a voltage pulse for each droplet to be emitted, said voltage pulse controlling said transducer to cause a pressure wave in said chamber such as to emit a droplet, and adjustable means included in said circuit for defining the duration and form of said voltage pulse in such a way as to provide at least one reflection suppressing pulse wave formed by a primary portion causing the emission of the droplet and a secondary portion symmetrical to the primary portion and delayed with respect to the primary portion by a time equal to an even multiple of said characteristic time, whereby the acoustic reflection waves of the pressure wave producing the emission of the droplet are suppressed.

2. A circuit according to claim 1, characterised in that the voltage pulse is formed by at least two superimposed reflecting suppressing waves which are phase-shifted in time by the said multiple.

3. A circuit according to claim 1, characterised in that the circuit is of the oscillating type to generate wave without harmonics, the said adjustable means being adjusted in such a way that the said multiple is two.

4. A circuit according to claim 3, characterised in that the adjustable means comprise a first adjusting element (42, 66) for varying the period of oscillation of the circuit.

5. A circuit according to claim 4, characterised in that the adjustable means comprise a second element (54) for regulating the duration of the logic signal in such a way as to produce phase distortion of the second of said reflection suppressing waves, corresponding to the form of said one end of the chamber carrying the nozzle (13).

6. A circuit according to claim 4, characterised in that the adjustable means further comprise a first electrical resistor (53) for varying the amplitude of the voltage pulse to adjust the speed of the drop, and at least one other electrical resistor (47) for adjusting the relationship between the positive peak and the negative peak of the voltage pulse and creating a final connection of the reflection suppressing wave to the feed voltage so as to attain critical damping of the voltage pulse.

7. A circuit according to claim 6, wherein the circuit directly generates the voltage of the control wave, characterised in that the first element comprises a variable inductor (42) and the said other resistor (48) is disposed between the inductor and the transducer (16).

8. A circuit according to claim 7 characterised in that the transducer is disposed in parallel with a reference capacitor (49) and is connected to the said other resistor (48) by way of a high-gain amplifier (51), whereby the effect of the variations is its capacitance which are due to temperature is correspondingly reduced.

9. A circuit according to claim 4, characterised in that it generates a low voltage control pulse, an amplifier (73) being disposed between said transducer and the output of the circuit and the transducer (16).

10. A circuit according to claim 9, characterised in that said two reflection suppressing waves of the pulse are generated by two corresponding operational amplifiers (64, 65) a third operational amplifier (67) being capable of generating the passage through zero of the pulse resulting from the two waves.

11. A circuit according to claim 10, characterised in that the said first element comprises a resistor (66) disposed between the first and second operational amplifiers (64, 65).

12. A circuit according to claim 10, characterised in that the said other resistor (72, 70) is capable of adjusting the gain of the first operational amplifier (64).

13. A circuit according to claim 4, characterised in that it comprises a read only memory (81) in which are recorded the digital values corresponding to the amplitude of said voltage pulse at predetermined intervals of time, and a digital to analog converter (82) for generating and converting the digital values which are read out of the memory into voltage values for control of the transducer (16).

14. A circuit according to claim 13, characterised in that the voltage values are supplied at low voltage, an amplifier (73) being disposed between the converter (82) and the transducer (16).

15. A circuit according to claim 13, characterised in that the memory (81) is addressed by a counter (78) which can be enabled for counting by a logic print signal (80) and incremented by a timer (79).

16. A circuit according to claim 15, characterised by means for varying the frequency of the timer to adjust the duration of the voltage pulse in the individual printing element.

17. A circuit according to claim 9, characterised in that it feeds the transducer (16) by way of a two-stage amplification circuit (84, 86 or 88, 89) the low voltage stage (84 or 88) comprising means (87 or 91) for adjusting the gain thereof.

18. A circuit according to claim 17, characterised in that the high voltage stage (86) is formed by a pair of transistors which are disposed in series.

19. A circuit according to claim 17, characterised in that the high voltage stage is formed by a transformer (89) having a primary winding connected to the low voltage stage (88) and the secondary winding connected to the transducer (16).

20. A circuit according to claim 9, characterised in that it is capable of selectively feeding a series of transducers (16) for a multi-nozzle printing head such that the transducers can be excited simultaneously or sequentially.

21. A circuit according to claim 20, characterised in that a corresponding amplifier (73) is disposed between each transducer (16) and the circuit (17'), the various amplifiers being connected selectively to the circuit by means of a multiplexer (92).

* * * * *